(12) United States Patent
Yano et al.

(10) Patent No.: US 11,383,305 B2
(45) Date of Patent: Jul. 12, 2022

(54) CBN SINTERED COMPACT AND CUTTING TOOL

(71) Applicant: MITSUBISHI MATERIALS CORPORATION, Tokyo (JP)

(72) Inventors: Masahiro Yano, Naka (JP); Shirou Oguchi, Naka (JP); Yosuke Miyashita, Naka (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 0 days.

(21) Appl. No.: 16/979,477

(22) PCT Filed: Mar. 14, 2019

(86) PCT No.: PCT/JP2019/010528
§ 371 (c)(1),
(2) Date: Sep. 9, 2020

(87) PCT Pub. No.: WO2019/177094
PCT Pub. Date: Sep. 19, 2019

(65) Prior Publication Data
US 2021/0001411 A1   Jan. 7, 2021

(30) Foreign Application Priority Data
Mar. 14, 2018 (JP) .............................. JP2018-047247

(51) Int. Cl.
B23B 27/14 (2006.01)
(52) U.S. Cl.
CPC ...... *B23B 27/148* (2013.01); *B23B 2226/125* (2013.01)

(58) Field of Classification Search
CPC .............................. B23B 27/14; B23B 27/148
USPC ............................................................ 51/307
See application file for complete search history.

(56) References Cited

U.S. PATENT DOCUMENTS

| 4,353,714 A | * | 10/1982 | Lee | .......................... B22F 3/26 |
| | | | | 51/298 |
| 4,401,443 A | | 8/1983 | Lee et al. | |
| 2017/0101346 A1 | | 4/2017 | Yumoto et al. | |

FOREIGN PATENT DOCUMENTS

| CN | 101848782 A | | 9/2010 |
| CN | 103052738 A | | 4/2013 |
| CN | 104418594 A | | 3/2015 |
| GB | 1 593 770 | * | 7/1981 |
| JP | 60-138044 A | | 7/1985 |
| JP | 61083681 A | | 4/1986 |
| JP | 2003-192446 | * | 7/2003 |
| JP | 2004-160637 A | | 6/2004 |

(Continued)

OTHER PUBLICATIONS

International Search Report dated Jun. 4, 2019 for the corresponding PCT International Application No. PCT/JP2019/010528.
(Continued)

*Primary Examiner* — Archene A Turner
(74) *Attorney, Agent, or Firm* — Leason Ellis LLP

(57) ABSTRACT

A cBN sintered compact has cubic boron nitride particles and a ceramic binder phase, and in the sintered compact, $WSi_2$ having an average particle diameter of 10 nm to 200 nm is dispersed such that a content thereof is 1 vol % to 20 vol %. A cutting tool has the cBN sintered compact as a tool body.

5 Claims, 1 Drawing Sheet

(56) References Cited

FOREIGN PATENT DOCUMENTS

| | | | |
|---|---|---|---|
| JP | 2006280164 A | 10/2006 | |
| JP | 2009-154219 A | 7/2009 | |
| JP | 5189504 B | 4/2013 | |
| JP | 2014233767 A | 12/2014 | |
| JP | 2015-009327 A | 1/2015 | |
| PL | 227103 B1 | 10/2017 | |

OTHER PUBLICATIONS

Japanese Office Action dated Jul. 29, 2021 for the corresponding Japanese Patent Application No. 2018-047247.
Japanese Notice of Allowance dated Nov. 9, 2021 for the corresponding Japanese Application No. 2018-047247.
European Search Report dated Nov. 11, 2021 for the corresponding European Patent Application No. 19767193.6.
Chinese Office Action dated Nov. 29, 2021 for the corresponding Chinese Patent Application No. 201980016596.5.

* cited by examiner

CBN SINTERED COMPACT AND CUTTING TOOL

CROSS-REFERENCE TO RELATED PATENT APPLICATIONS

This application is a U.S. National Phase application under 35 U.S.C. § 371 of International Patent Application No. PCT/JP2019/010528 filed on Mar. 14, 2019 and claims the benefit of priority to Japanese Patent Application No. 2018-047247, filed Mar. 14, 2018, all of which are incorporated herein by reference in their entirety. The International Application was published in Japanese on Sep. 19, 2019 as International Publication No. WO/2019/177094 under PCT Article 21(2).

FIELD OF THE INVENTION

The present invention relates to a cubic boron nitride (hereinafter, referred to as "cBN")-based ultra-high pressure sintered compact (hereinafter, referred to as "cBN sintered compact") having excellent toughness, and a cutting tool having the sintered compact as a tool body (hereinafter, referred to as "CBN tool").

BACKGROUND OF THE INVENTION

A cBN sintered compact has been known to have excellent toughness, and has a low affinity with an iron-based material. Accordingly, the cBN sintered compact is widely used as a material for a cutting tool for an iron-based work material such as steel or cast iron by utilizing the above characteristics.

For example, Japanese Unexamined Patent Application, First Publication No. 2004-160637 describes a cBN sintered compact having the following configuration.

(a) About 60 to 80 vol % of cBN having an average particle size of about 3 to 6 μm is contained.

(b) A ceramic binder phase is contained in a content of about 40 to 20 vol %, (i) about 20 to 60 vol % of the ceramic binder phase is at least one of carbides, nitrides, and borides of metals of Group 4B or 6B, and (ii) about 40 to 80 vol % of the ceramic binder phase is at least one of carbides, nitrides, borides, and oxides of aluminum.

(c) About 3 to 15 wt % of tungsten is contained, and an XRD intensity ratio between the [101] $TiB_2$ peak and the [110] WB peak is less than about 0.4.

A cBN sintered compact described in Japanese Patent No. 5189504 has 20 vol % to 80 vol % of cubic boron nitride particles and a binder, the binder contains at least one selected from the group consisting of nitrides, carbides, borides, and oxides of elements of Group 4a, Group 5a, and Group 6a in the periodic table, and solid solutions thereof, at least one selected from the group consisting of simple substances of Zr, Si, Hf, Ge, W and Co, compounds thereof, and solid solutions thereof, and a compound of Al, wherein the total weight of W and/or Co in a case where the composite sintered compact contains W and/or Co is less than 2.0 wt %, the composite sintered compact further contains at least one of Zr, Si, Hf, and Ge (hereinafter, referred to as "X") described above, the content of each X is 0.005 wt % to less than 2.0 wt %, X/(X+W+Co) is 0.01 to 1.0, and the weight of Al is 2.0 wt % to 20.0 wt %.

Technical Problem

Since the cBN sintered compact described in Japanese Unexamined Patent Application, First Publication No. 2004-160637 contains W in the sintered compact, a Ti boride ($TiB_2$) phase and a W boride (WB) phase are simultaneously generated during sintering. The generated W boride phase suppresses the generation of the Ti boride phase at the cBN particle-binder phase interface, and the XRD intensity ratio between the [101] $TiB_2$ peak and the [110] WB peak is suppressed to less than about 0.4. Accordingly, the adhesiveness at the cBN particle-binder phase interface is reduced. This triggers the occurrence of cracks, and thus a problem occurs in which toughness and defect resistance are reduced.

The cBN sintered compact described in Japanese Patent No. 5189504 contains a predetermined content of W and/or Co, Si, or Zr in a binder phase in order to increase the strength and toughness of the binder phase. In a case where a ratio of W in the sintered compact is high, the toughness of the sintered compact is reduced, and in a case where the content of Si is large, the diffusion reaction of the binder is excessively suppressed, the bonding force between the cBN particles and the binder, and between the binders is reduced, and a problem occurs in which the toughness of the sintered compact is reduced. In addition, in a case where dispersibility is poor during mixing, a part with a high concentration of additives is locally generated, and the toughness of the binder in that part is reduced. In a case where the sintered compact is used as a tool, the above part becomes a point where fracture starts, and thus a problem occurs in which defect resistance is reduced.

An object of the present invention is to solve a problem that a cBN sintered compact cannot secure sufficient toughness in the related art, and to provide a cBN sintered compact having high toughness and a CBN tool having the sintered compact as a tool body.

SUMMARY OF THE INVENTION

Solution to Problem

Regarding a cBN sintered compact and a CBN tool having the sintered compact as a tool body, in order to solve the problems, the present inventors have conducted intensive studies on dispersed particles which do not cause a reduction in the adhesiveness at the cBN particle-binder phase interface even in a case where the cBN sintered compact contains a W compound. As a result, it has been found that in a case where particles which do not form a reaction product with cBN particles are dispersed, the formation of a Ti boride phase which is generated at the cBN particle-binder phase interface is not hindered. Furthermore, it has been newly found that $WSi_2$ particles are suitable as the above particles, and that in a case where fine $WSi_2$ particles whose average particle diameter is in a specific range are dispersed in the binder phase of the cBN sintered compact, the progress of cracks is finely diverted by $WSi_2$ even during the occurrence of the cracks in the sintered compact, and the linear progress can be suppressed, whereby a cBN sintered compact having high toughness can be obtained. It has also been found that in a case where the cBN sintered compact is used as a tool body of a cutting tool, a cutting edge is less likely to be damaged even if intermittent cutting with a large load on the cutting edge is performed.

The present invention is contrived based on the above findings, and has the following configurations.

(1) According to a first aspect of the present invention, cBN sintered compact comprises (or consists of) cubic boron nitride particles and a ceramic binder phase, and in the cBN sintered compact, $WSi_2$ having an average particle diameter of 10 nm to 200 nm is dispersed such that the content thereof is 1 vol % to 20 vol %.

(2) According to another aspect of the present invention, a cutting tool has the cBN sintered compact according to (1) as a tool body.

Advantageous Effects of Invention

In a cBN sintered compact according to the present invention, a reaction product with cBN particles, that is, fine $WSi_2$ particles not containing B and N as constituent components thereof are dispersed, and thus the generation of a Ti boride phase at the cBN particle-binder phase interface is not inhibited, and adhesiveness at the cBN particle-binder phase interface is not reduced. In addition, the progress of cracks can be finely diverted by $WSi_2$ dispersed in the sintered compact, and thus the linear progress of cracks is suppressed and a toughness-increasing effect is exhibited.

A cutting tool according to the present invention uses the cBN sintered compact as a tool body, whereby a cutting edge is less likely to be damaged even if intermittent cutting with a large load on the cutting edge is performed. The cutting tool has excellent wear resistance and excellent defect resistance over long term use even in a case where it is used in, for example, interrupted cutting of high hardness steel.

DETAILED DESCRIPTION OF THE INVENTION

Figure 1:
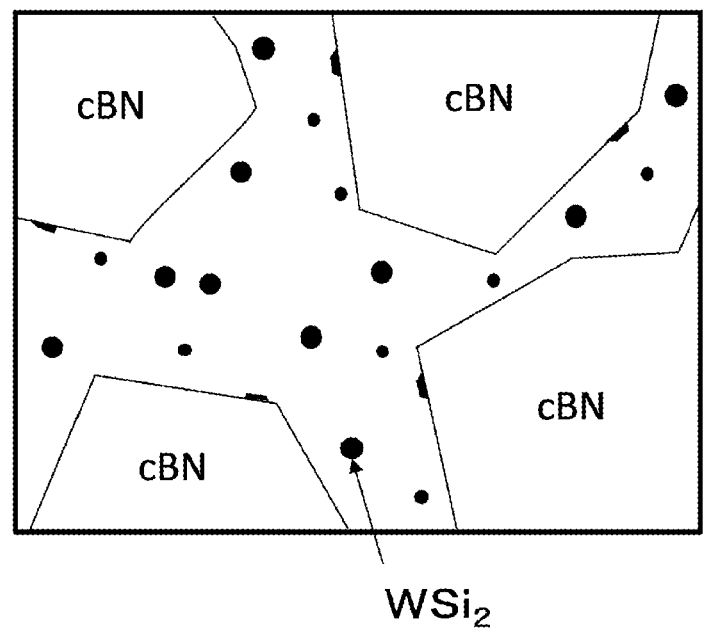
FIG. 1 is a schematic diagram showing dispersion of $WSi_2$ contained in a sintered structure in a cBN sintered compact according to an embodiment of the present invention, and the shape and size of each structure do not correspond to the actual structure.

Hereinafter, the present invention will be described in detail. In this specification, a numerical range expressed using "to" includes numerical values of an upper limit and a lower limit thereof.

[Average Particle Diameter of cBN Particles]

The average particle diameter of cBN particles used in the present invention is not particularly limited, and is preferably in a range of 0.2 to 8.0 µm. Accordingly, since hard cBN particles are contained in the sintered compact, a defect resistance-increasing effect is obtained. By dispersing cBN particles having an average particle diameter of 0.2 to 8.0 µm in the sintered compact, defects or chipping originating from the uneven shape of a cutting edge caused by the falling of cBN particles on a tool surface during use of the tool is suppressed. Furthermore, the propagation of cracks progressing from the interface between the cBN particles and the binder phase caused by the stress applied to the cutting edge during use of the tool, or cracks progressing due to breakage of the cBN particles is suppressed, and thus excellent defect resistance can be obtained.

The average particle diameter of the cBN particles can be determined as follows.

A cross-sectional structure of the cBN sintered compact is observed with a scanning electron microscopy (SEM) to obtain a secondary electron image. In the obtained image, a part corresponding to the cBN particles is extracted by image processing, and an average particle diameter is calculated based on the maximum lengths of the particles obtained by image analysis. In extracting a part corresponding to the cBN particles in the image by image processing, in order to clearly determine the cBN particles and the binder phase, an image of 256 gradations is displayed in monochrome with 0 as a black pixel and 255 as a white pixel, and binarization processing is performed using the image of the pixel value at which the ratio of the pixel value of the part corresponding to the cBN particles to the pixel value of the part corresponding to the binder phase is 2 or more such that the cBN particles are black.

The pixel values of the part corresponding to the cBN particles and the part corresponding to the binder phase are obtained from the average values in a region of about 0.5 µm×0.5 µm. It is preferable to obtain average values of pixel values in three different regions at least in the same image and to use the average value thereof as each contrast.

After the binarization processing, processing is performed to separate parts where the cBN particles are thought to be in contact with each other. For example, watershed (watershed algorithm/an algorithm in which a region is obtained by expanding the center of the region called a mark to adjacent pixels) is used to separate the cBN particles which are thought to be in contact with each other.

The part corresponding to the cBN particles (black part) in the image obtained after the binarization processing is subjected to particle analysis, and the maximum length obtained is defined as the maximum length of each particle, and it is defined as the diameter of each particle. As the particle analysis for obtaining the maximum length, the value of a larger one of the two lengths obtained by calculating the Feret's diameter for one cBN particle is defined as the maximum length, and the value thereof is defined as the diameter of each particle. Assuming that particle having the above diameter is an ideal sphere, the volume of each particle is calculated, and the cumulative volume is obtained. Based on the cumulative volume, a graph is drawn with the volume percent [%] as a vertical axis and the diameter [µm] as a horizontal axis. The diameter at which the volume percentage is 50% on the graph is defined as the average particle diameter of the cBN particles, and the average value of the average particle diameters obtained by performing the above processing on three observation regions is defined as the average particle diameter [µm] of cBN. In a case where the particle analysis is performed, the length (µm) per pixel is set using the scale value known in advance by SEM. The observation region used in the image processing is preferably a visual field region of about 15.0 µm×15.0 µm in a case where the cBN particles have an average particle diameter of 3 µm.

[Content of cBN Particles in cBN Sintered Compact]

The content of the cBN particles in the cBN sintered compact is not particularly limited. However, in a case where the content is less than 40 vol % (vol %), the content of hard substances is small in the sintered compact, and in a case where the sintered compact is used as a tool, defect resistance may be reduced. In a case where the content is greater than 78 vol %, voids which are points where cracking starts may be generated in the sintered compact, and defect resistance may be reduced. Therefore, in order to further exhibit the effects of the present invention, the content of the cBN particles in the cBN sintered compact is preferably in a range of 40 to 78 vol %.

[$WSi_2$ Dispersed in cBN Sintered Compact]

$WSi_2$ dispersed in the cBN sintered compact will be described.

(1) Average Particle Diameter

The average particle diameter of $WSi_2$ is set to 10 nm to 200 nm. The reason why the average particle diameter is set to be in the above range is that in a case where the average particle diameter is greater than 200 nm, the occurrence and progress of cracks originating from the $WSi_2$ particles in the binder phase are likely to occur, and thus the toughness of the cBN sintered compact is reduced, and in a case where the average particle diameter is less than 10 nm, the progress of cracks cannot be sufficiently suppressed by being finely diverted. The average particle diameter of $WSi_2$ is more preferably 10 nm to 160 nm.

(2) Content $WSi_2$ exists in the cBN sintered compact such that the content thereof is 1 vol % to 20 vol %. The reason why the content is set to be in the above range is that in a case where the content is less than 1 vol %, the progress of cracks cannot be sufficiently suppressed by being finely diverted, and the toughness of the cBN sintered compact is not sufficiently improved, and in a case where the content is greater than 20 vol %, the probability that the $WSi_2$ particles are in contact with each other in the sintered compact is increased, the adjacent $WSi_2$ particles are bound to each other to form enlarged $WSi_2$ particles, cracks originating from the enlarged $WSi_2$ particles are likely to occur, and thus the toughness of the cBN sintered compact is reduced. The content is more preferably 3 vol % to 15 vol %.

[Method of Manufacturing cBN Sintered Compact]

An example of the procedure for preparing a cBN sintered compact having excellent toughness according to the present invention will be shown below.

(1) Preparation of Raw Material Powders of Components Constituting Binder Phase

As a raw material powder constituting the binder phase, a $WSi_2$ raw material and a raw material which mainly constitutes the binder phase are prepared. A $WSi_2$ powder having an average particle diameter of 3 μm is prepared as the $WSi_2$ raw material. Regarding the $WSi_2$ powder, in order to prepare a $WSi_2$ raw material powder comminuted to a desired particle diameter, for example, a container lined with cemented carbide is filled with the powder together with cemented carbide balls and acetone, and covered with a lid, and then the materials in the container are comminuted by a ball mill. Then, the resulting material is classified using a centrifugal, and thus a $WSi_2$ raw material powder, in which a median diameter D50 in a case where the vertical axis represents the volume percent and the horizontal axis represents the particle diameter is an average particle diameter of the $WSi_2$ raw material powder, and a value thereof is 10 to 200 nm, is obtained. A binder phase forming raw material powder (TiN powder, TiC powder, TiCN powder, $TiAl_3$ powder, $Al_2O_3$ powder) which has been known is prepared as the raw material which mainly constitutes the binder phase.

(2) Comminution and Mixing

For example, a container lined with cemented carbide is filled with the above raw material powders together with cemented carbide balls and acetone, and covered with a lid, and then the materials in the container are comminuted and mixed by a ball mill. Then, a cBN powder having an average particle diameter of 0.2 to 8.0 μm functioning as a hard phase is added, and ball mill mixing is further performed.

(3) Forming and Sintering

Next, the obtained sintered compact raw material powder is molded at a predetermined pressure to prepare a compact. The compact is pre-sintered at 1,000° C., and then charged into an ultra-high pressure sintering device and sintered at a pressure: 5 GPa and a temperature: a predetermined temperature of 1,200° C. to 1,600° C. to prepare a cBN sintered compact according to the present invention.

[CBN Tool]

A cutting tool made of a cBN-based ultra-high pressure sintered compact having the cBN sintered compact according to the present invention having excellent toughness as a tool body has excellent defect resistance even if intermittent cutting of high hardness steel is performed, and exhibits excellent wear resistance for long term use.

[Measuring Methods of Numerical Values]

Measuring methods of the numerical values specified in the present invention will be described.

[Average Particle Diameter of $WSi_2$]

In order to measure the average particle diameter of $WSi_2$, a cross-sectional structure of the cBN sintered compact is subjected to Auger electron spectroscopy (hereinafter, referred to as AES) to obtain a mapping image of the W element and the Si element. In the obtained images, a part where the W element and the Si element overlap is extracted by image processing, and the average particle diameter is calculated based on the particles specified by image analysis.

In the calculation of the average particle diameter of $WSi_2$, the Feret's diameter of each particle in which the part where the W element and the Si element overlap is recognized as $WSi_2$ based on the mapping image of the W element and the Si element in one image is defined as the diameter of each particle. The cumulative volume is calculated in the same manner as in the case of cBN based on the volume of each particle calculated from the diameter, and from the cumulative volume, a graph is drawn with the volume percent [%] as a vertical axis and the diameter [μm] as a horizontal axis. A diameter when the volume percentage is 50% is defined as the average particle diameter of $WSi_2$ in one image used in the measurement. The average value of the average particle diameters obtained by performing the above processing on three images is defined as the average particle diameter [μm] of $WSi_2$. In a case where the particle analysis is performed, the length (μm) per pixel is set using the scale value known in advance by AES. The observation region used in the image processing is preferably a visual field region of about 5.0 μm×3.0 μm.

[Content of $WSi_2$ in Sintered Compact]

The content of $WSi_2$ in the cBN sintered compact is calculated using a mapping image of the W element and the Si element obtained by AES performed on the cross-sectional structure of the cBN sintered compact. In the observed one image, a part where the W element and the Si element overlap is extracted as $WSi_2$ by image processing. The area of $WSi_2$ is calculated by image analysis, and the ratio of $WSi_2$ is obtained. The average value of the area ratios of $WSi_2$ calculated by performing the above processing on at least three images is obtained as the content of $WSi_2$ in the cBN sintered compact. The observation region used in the image processing is preferably a visual field region of about 5.0 μm×3.0 μm.

EXAMPLES

Example 1

Hereinafter, examples of the present invention will be described.

In the manufacturing of a cBN sintered compact according to this embodiment, a $WSi_2$ powder was prepared as a raw material powder for constituting a binder phase, and comminuted by a ball mill to control the particle diameter of $WSi_2$, and then the comminuted material was classified using a centrifugal separation method to prepare a $WSi_2$ raw material powder whose particle diameter was in a desired range. That is, a $WSi_2$ powder having an average particle diameter of 3 μm is prepared, a container lined with cemented carbide is filled with the powder together with cemented carbide balls and acetone, and covered with a lid, the materials in the container is comminuted using a ball mill, and then the mixed slurry is dried and classified using a centrifugal, whereby a $WSi_2$ raw material powder having an average particle diameter of 50 to 200 nm can be obtained.

The $WSi_2$ raw material powder prepared in advance as described above, and a TiN powder, a TiC powder, a TiCN powder, a $TiAl_3$ powder, and an $Al_2O_3$ powder having an average particle diameter of 0.3 μm to 0.9 μm were prepared. Some raw material powders for constituting a binder phase (vol % of each raw material powder are shown in Table 1) selected from the above raw material powders and a cBN powder as a raw material for a hard phase were blended, wet-mixed, and dried such that the content of cBN particles after sintering was 40 to 78 vol % when the content of the powders was 100 vol %.

Then, the obtained sintered compact raw material powder was press-formed at a forming pressure of 1 MPa to have a size of diameter: 50 mm×thickness: 1.5 mm, and the resulting compact was kept and pre-sintered at a predetermined temperature within a range of 1,000° C. in a vacuum atmosphere at a pressure of 1 Pa or less, and then charged into an ultra-high pressure sintering device and sintered at a pressure of 5 GPa and a temperature of 1,400° C. to prepare cBN sintered bodies 1 to 12 (referred to as invention sintered bodies 1 to 12) according to the present invention shown in Table 2. A main purpose of the heat treatment performed on the compact is to remove the solvent used during wet-mixing. In the above preparation process, it is preferable to prevent the raw material powder from being oxidized in the steps up to the ultra-high pressure sintering as in this example, and specifically, it is preferable to handle the raw material powder in a non-oxidizing protective atmosphere.

Figure 2:
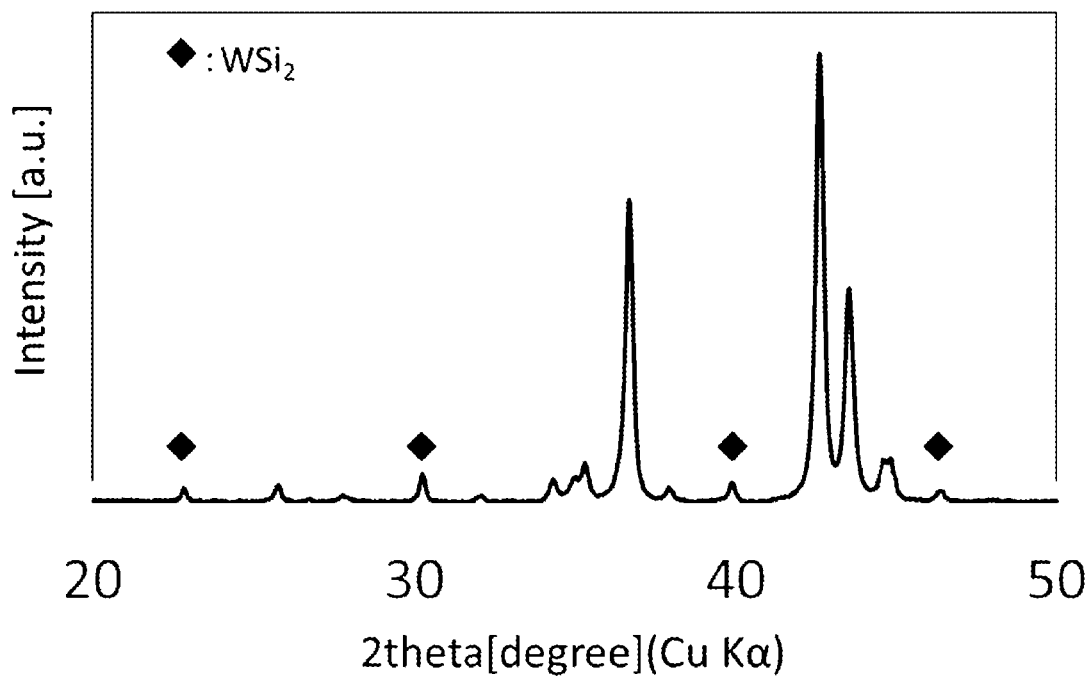
FIG. 2 is a diagram showing an example of X-ray diffraction (XRD) of an invention sintered compact 9 as a cBN sintered compact according to the present invention.

FIG. 2 shows an XRD diagram of the invention sintered compact 9.

TABLE 1

| Type | | Blending Composition (vol %) | | | | |
|---|---|---|---|---|---|---|
| | | TiN | TiCN | TiC | $TiAl_3$ | $Al_2O_3$ |
| Raw Material for Binder Phase for Invention Other Than $WSi_2$ | A | 73 | — | — | 25 | 2 |
| | B | 75 | — | — | 25 | 0 |
| | C | — | 75 | — | 25 | 0 |
| | D | — | — | 74 | 25 | 1 |

TABLE 2

| Type | | cBN Content (vol %) | cBN Average Particle Diameter (μm) | Raw Material for Binder Phase Other Than $WSi_2$ | Average Particle Diameter D50 [nm] of $WSi_2$ Raw Material Powder Classified After Comminution | Average Particle Diameter of $WSi_2$ (nm) | $WSi_2$ Content (vol %) | Composition of Binder Phase (XRD peak) |
|---|---|---|---|---|---|---|---|---|
| Invention Sintered compact | 1 | 40 | 1.8 | D | 80 | 82 | 16 | TiC, $TiB_2$, AlN, $Al_2O_3$, $WSi_2$ |
| | 2 | 61 | 0.5 | C | 50 | 48 | 1 | TiCN, $TiB_2$, AlN, $Al_2O_3$, $WSi_2$ |
| | 3 | 54 | 8.0 | B | 100 | 97 | 3 | TiN, $TiB_2$, AlN, $Al_2O_3$, $WSi_2$ |
| | 4 | 59 | 2.1 | A | 50 | 52 | 10 | TiN, $TiB_2$, $Al_2O_3$, $WSi_2$ |
| | 5 | 57 | 1.9 | B | 150 | 152 | 12 | TiN, $TiB_2$, $Al_2O_3$, $WSi_2$ |
| | 6 | 63 | 2.0 | B | 80 | 78 | 8 | TiN, $TiB_2$, $Al_2O_3$, $WSi_2$ |
| | 7 | 58 | 1.7 | A | 10 | 10 | 11 | TiN, $TiB_2$, $Al_2O_3$, $WSi_2$, WC |
| | 8 | 61 | 2.0 | B | 200 | 200 | 10 | TiN, $TiB_2$, $Al_2O_3$, $WSi_2$ |
| | 9 | 61 | 2.3 | B | 100 | 101 | 11 | TiN, $TiB_2$, $Al_2O_3$, $WSi_2$ |
| | 10 | 61 | 0.2 | A | 50 | 48 | 9 | TiN, $TiB_2$, $Al_2O_3$, $WSi_2$ |
| | 11 | 58 | 4.9 | B | 150 | 147 | 20 | TiN, $TiB_2$, $Al_2O_3$, $WSi_2$ |
| | 12 | 78 | 3.5 | A | 80 | 77 | 5 | TiN, $TiB_2$, $Al_2O_3$, $WSi_2$, WC |

For comparison, (1) a case where $WSi_2$ is not contained, (2) a case where a $WSi_2$ raw material powder whose average particle diameter is out of the range specified in the present invention, obtained by pulverizing a $WSi_2$ raw material using a ball mill and classifying the comminuted material using a centrifugal, is used, and (3) a case where a $WSi_2$ raw material powder whose average particle diameter is in the range specified in the present invention is used with a $WSi_2$ content that is out of the range specified in the present invention were respectively examined. The above $WSi_2$ powders (there is a case where $WSi_2$ is not contained), and a TiN powder, a TiC powder, a TiCN powder, a $TiAl_3$ powder, and an $Al_2O_3$ powder having an average particle diameter of 0.3 μm to 0.9 μm were prepared. Some raw material powders for constituting a binder phase (vol % of each raw material powder is shown in Table 3) selected from the above raw material powders and a cBN powder as a hard phase were wet-mixed, and the obtained mixture was dried. The blending ratio of the powders was adjusted such that the content of cBN particles after sintering was 58 to 63 vol % when the content of the mixture was 100 vol %.

Thereafter, compacts were prepared and heat-treated under the same conditions as those of the invention sintered bodies 1 to 12. The compacts were subjected to ultra-high pressure and high temperature sintering under the same conditions as those of the invention sintered bodies 1 to 12, and thus cBN sintered bodies of comparative examples (hereinafter, referred to as comparative example sintered bodies) 1 to 5 shown in Table 4 were prepared.

TABLE 3

| Type | | Blending Composition (vol %) | | | | |
| --- | --- | --- | --- | --- | --- | --- |
| | | TiN | TiCN | TiC | TiAl$_3$ | Al$_2$O$_3$ |
| Raw Material For Binder Phase for Comparative Examples Other Than WSi$_2$ | E | 75 | — | — | 25 | 0 |
| | F | 73 | — | — | 25 | 2 |

TABLE 4

| Type | | cBN | | Raw Material for Binder Phase Other Than WSi$_2$ | Average Particle Diameter D50 [nm] of WSi$_2$ Raw Material Powder Classified After Comminution | Average Particle Diameter of WSi$_2$ (nm) | WSi$_2$ Content (vol %) | Composition of Binder Phase (XRD peak) |
| --- | --- | --- | --- | --- | --- | --- | --- | --- |
| | | Content (vol %) | Average Particle Diameter (µm) | | | | | |
| Comparative Example Sintered compact | 1 | 62 | 1.7 | E | — | — | 0 | TiN, TiB$_2$, Al$_2$O$_3$ |
| | 2 | 59 | 2.1 | F | 3 | 3.2 | 8 | TiN, TiB$_2$, Al$_2$O$_3$, WSi$_2$ |
| | 3 | 61 | 3.3 | E | 15 | 13 | 0.2 | TiN, TiB$_2$, Al$_2$O$_3$, WSi$_2$ |
| | 4 | 58 | 0.2 | E | 50 | 48 | 30 | TiN, TiB$_2$, Al$_2$O$_3$, WSi$_2$, WC |
| | 5 | 63 | 1.8 | F | 500 | 493 | 10 | TiN, TiB$_2$, Al$_2$O$_3$, WSi$_2$ |

Next, the invention sintered bodies 1 to 12 and the comparative example sintered bodies 1 to 5 were cut into a predetermined size by a wire electric discharge machine. A WC-based cemented carbide insert body having a composition of Co: 5 mass %, TaC: 5 mass %, and WC: remainder and an insert shape of ISO standard CNGA120408 was manufactured. To a brazing portion (corner portion) of each insert body, the invention sintered bodies 1 to 12 and the comparative example sintered bodies 1 to 5 were brazed using a brazing material of an Ag alloy having a composition of Cu: 26 mass %, Ti: 5 mass %, and Ag: remainder, respectively, and polishing and horning were performed on the upper and lower surfaces and on the outer periphery, and thus cBN-based ultra-high pressure sintered compact cutting tools (referred to as invention tools) 1 to 12 of the present invention having an insert shape of ISO standard CNGA120408, and cBN-based ultra-high pressure sintered compact cutting tools (referred to as comparative tools) 1 to 5 of comparative examples were manufactured.

Next, the invention tools 1 to 12 and the comparative tools 1 to 5 were cut under the following cutting conditions, and tool lives thereof (number of interruptions) until defects occurred was measured.

<Cutting Conditions>

Work Material: Round bar with equally spaced 8 vertical grooves in length direction of carburized and tempered steel (JIS SCM415, hardness: HRC 58 to 62), Cutting Speed: 200 m/min, Cutting depth: 0.1 mm Feeding: 0.1 mm/rev A dry cutting test of high hardness steel was performed under the above conditions. The number of interruptions until chipping or defects occurred in the cutting edge of each tool was defined as a tool life, and the cutting edge was observed every 500 times of interruptions to confirm the presence or absence of defects or chipping of the cutting edge. Table 5 shows the results of the cutting test.

TABLE 5

| Type | Tool Life (number of interruptions) |
| --- | --- |
| Invention Tool 1 | Chipping (after 6,000 times) |
| Invention Tool 2 | Chipping (after 5,500 times) |
| Invention Tool 3 | Chipping (after 7,000 times) |
| Invention Tool 4 | Chipping (after 7,000 times) |
| Invention Tool 5 | Chipping (after 7,000 times) |
| Invention Tool 6 | Chipping (after 8,000 times) |
| Invention Tool 7 | Chipping (after 7,000 times) |
| Invention Tool 8 | Chipping (after 6,500 times) |
| Invention Tool 9 | Chipping (after 8,000 times) |
| Invention Tool 10 | Chipping (after 7,500 times) |
| Invention Tool 11 | Chipping (after 7,000 times) |
| Invention Tool 12 | Chipping (after 8,500 times) |
| Comparative Example Tool 1 | Defects (after 1,500 times) |
| Comparative Example Tool 2 | Defects (after 1,000 times) |
| Comparative Example Tool 3 | Defects (after 1,500 times) |
| Comparative Example Tool 4 | Defects (after 1,000 times) |
| Comparative Example Tool 5 | Chipping (after 1,500 times) |

From the results shown in Table 5, it has been found that the invention tools had a longer tool life and improved toughness without sudden cutting edge chipping, as compared to the comparative tools. Even in the intermittent cutting of high hardness steel, the invention tools have excellent effects such as excellent wear resistance and defect resistance over long term use.

INDUSTRIAL APPLICABILITY

In a case where a cBN sintered compact according to the present invention is used as a tool body of a CBN tool, the tool exhibits excellent defect resistance over long term use without the occurrence of defects in the tool body, and has an increased tool life, and it is possible to increase the performance of the cutting device and to achieve labor saving, energy saving, and cost saving in the cutting. Accordingly, the cBN sintered compact can be industrially used.

What is claimed is:
1. A cBN sintered compact comprising:
   cubic boron nitride particles; and
   a ceramic binder phase,
   wherein WSi$_2$ particles having an average diameter of 10 nm or more and 200 nm or less are dispersed in the ceramic binder phase in a content of 1 vol % or more and 20 vol % or less of the cBN sintered compact.

2. A cutting tool comprising:
a tool body formed of the cBN sintered compact according to claim 1.

3. The cBN sintered compact according to claim 1, wherein the ceramic binder phase contains at least one of TiN, TiC, TiCN, $TiB_2$, AlN, $Al_2O_3$, and WC.

4. The cBN sintered compact according to claim 1, wherein an average particle diameter of the cBN particles is in a range of 0.2 to 8.0 µm.

5. The cBN sintered compact according to claim 1, wherein a content of the cBN particles in the cBN sintered compact is in a range of 40 to 78 vol %.

* * * * *